(12) United States Patent
De'Longhi

(10) Patent No.: US 8,941,033 B2
(45) Date of Patent: Jan. 27, 2015

(54) DEVICE FOR PROCESSING AND COOKING OF FOODSTUFFS

(75) Inventor: Giuseppe De'Longhi, Treviso (IT)

(73) Assignee: De'Longhi, Appliances S.R.L., Treviso (IT)

( * ) Notice: Subject to any disclaimer, the term of this patent is extended or adjusted under 35 U.S.C. 154(b) by 385 days.

(21) Appl. No.: 13/519,279

(22) PCT Filed: Jan. 18, 2011

(86) PCT No.: PCT/EP2011/050577
§ 371 (c)(1),
(2), (4) Date: Jun. 26, 2012

(87) PCT Pub. No.: WO2011/098323
PCT Pub. Date: Aug. 18, 2011

(65) Prior Publication Data
US 2012/0285945 A1    Nov. 15, 2012

(30) Foreign Application Priority Data

Feb. 12, 2010 (IT) .............................. MI2010A0217

(51) Int. Cl.
*F24C 7/10* (2006.01)
*A47J 43/07* (2006.01)
*B02C 23/04* (2006.01)

(52) U.S. Cl.
CPC .................................. *A47J 43/0777* (2013.01)
USPC ................ 219/386; 241/36; 99/348

(58) Field of Classification Search
CPC ... A47J 43/075; A47J 43/0777; A47J 43/046; A47J 43/0716; A47J 43/0772; A47J 43/0722; A47J 43/0755; A47J 43/0761; A47J 43/0766
See application file for complete search history.

(56) References Cited

FOREIGN PATENT DOCUMENTS

| | | |
|---|---|---|
| DE | 20206403 U1 | 7/2002 |
| EP | 0757531 B1 | 6/1998 |
| EP | 2025272 A1 | 2/2009 |
| WO | 2006070980 A1 | 7/2006 |

OTHER PUBLICATIONS

International Search Report of PCT/EP2011/050577 dated Sep. 12, 2011.

*Primary Examiner* — Shawntina Fuqua
(74) *Attorney, Agent, or Firm* — Amster, Rothstein & Ebenstein LLP

(57) ABSTRACT

The device (1) for the processing and cooking of foodstuffs includes a base (2), a container (3) with, on the outer side of its bottom (4), a fixed protecting shell (5) by means of which the container (3) stands in a positioning housing (6) provided on said base (2), a lid (7) to close said container (3), electrical heating means supported by said container (3), a shaft (12) carrying tools (13) rotatably supported inside said container (3), electric means for powering said shaft (12), and safety means at least capable of mechanically clamping the container (3) into its positioning housing (6) and of activating the electric feed of said powering means when said lid (7) moves from an open position to a closed position of said container (3) positioned in said positioning housing (6), the safety means comprising kinematic system for reversibly transforming the movement of the lid (7) between its open position and its closed position into a reversible translation stroke of a first clamping element (26) between a withdrawn position within said protecting shell (5) and an extended position outside said shell (5) wherein said first clamping element (26) engages a first clamp housing (27) provided in said positioning housing (6) and triggers a first micro-switch (28) generating a signal to activate said electric feed of said powering means.

10 Claims, 3 Drawing Sheets

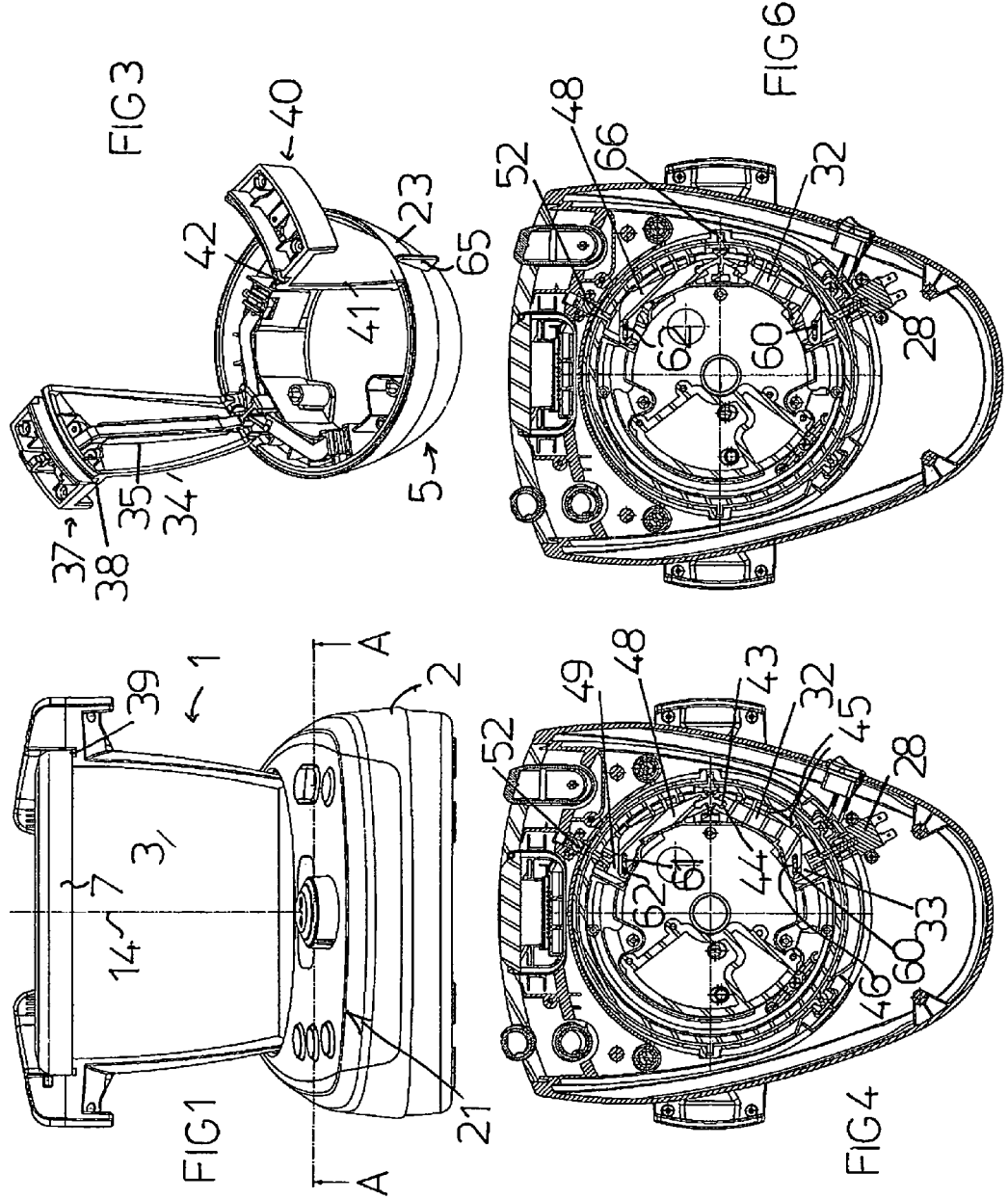

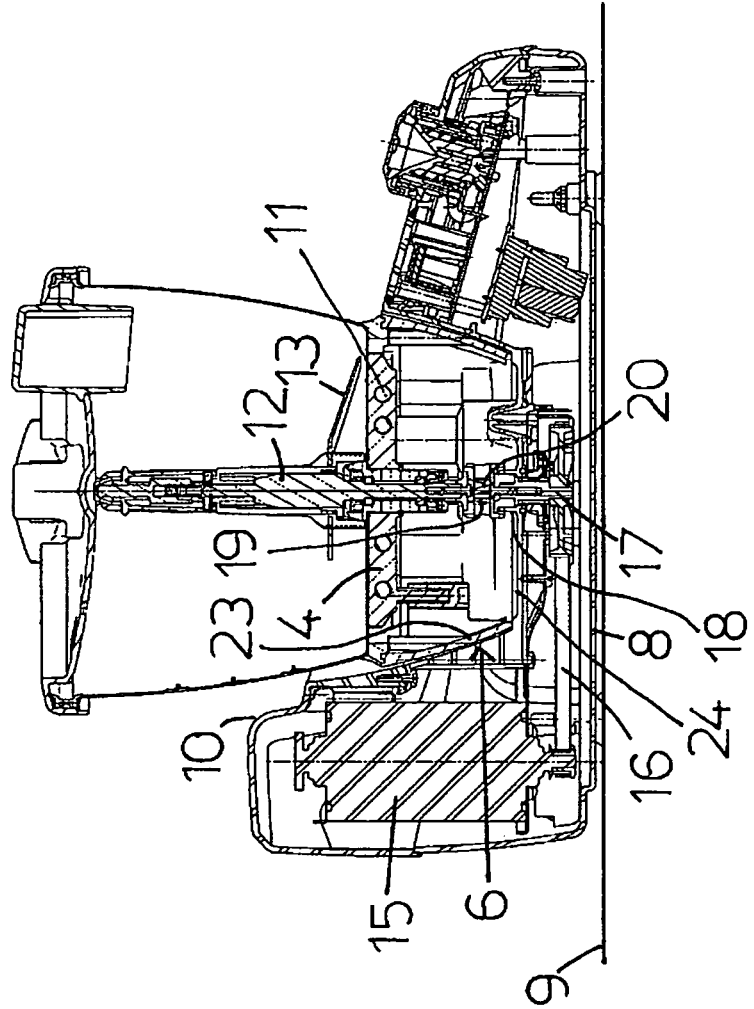

DEVICE FOR PROCESSING AND COOKING OF FOODSTUFFS

The present invention relates to a device for the processing and cooking of foodstuffs, in jargon called "food processor", of the type including a base carrying the control panel, a removably positioned container in a housing formed on the base, and a closing lid of the container.

The container which can be heated through an electric resistance, has internally a motorized shaft carrying tools.

Suitable safety means are capable of both mechanically clamping the container in its positioning housing and activating the electric feed of the motor of the shaft carrying tools, when the lid moves from an open position to a closed position of the correctly positioned container in its own positioning housing.

A device of the aforementioned kind is capable both of processing, for example of grinding, crumbling, cutting, chopping, mixing the food through the rotary tool, in order to both cook it or actuating, according to a determined program depending on the preparation recipe of the food, its electric resistance.

In the known processing and cooking devices, generally two main types of safety means are used.

In a first case the container is positioned in its positioning housing through a single translation movement in the direction of its central axis. Both the mechanical clamping of the container and electric feeding circuit of the motor are actuated by the rotation of the lid on the container from the opening position to the closing position of the latter. The base, at the motor housing, has a vertical elongation upwards laterally extending to the container and defining, at the height of the lid, a clamping housing a clamping element carried by the lid is removably engageable.

This solution, for the presence of the vertical elongation of the base, clearly suffers of an excessive encumbrance as a whole of the processing and cooking of foodstuffs.

In a second case the container is placed in its positioning housing by means of a first translation movement in the direction of its central axis and of a rotation around its own central axis. By means of the rotation around its own axis the container blocks itself in the correct position inside its own positioning housing. The actuation of the feeding circuit of the electric resistance is not due to the rotation of the container in its positioning housing, but to the rotation of the container lid.

This solution suffers from an excessive structural and use complication of the processing and cooking of foodstuffs, in that it needs a not always easy operation for the correct positioning of the container and a precise coordination between the intervention of the mechanical safety, due to the movement of the container into the base and the intervention of the electric safety due to the movement of the container lid.

The technical task of the present invention is therefore to realize a device for processing and cooking of foodstuffs, permitting to eliminate the technical drawbacks lamented in the known technique. Inside this technical task, one aim of the invention is that to realize a device for processing and cooking of foodstuffs with a little encumbrance, easy to use and functionally precise, reliable and efficient.

The technical task, and also these and other aims, according to the present invention are reached by realizing a device for processing and cooking of foodstuffs of the type comprising a base, a container bringing fixed on its external side of the base a protective housing by means the container houses in a positioning housing realized on said base, a closing lid of said container, electric heating means supported by said container, a shaft carrying tools rotatably supported inside said container, electric means for powering said shaft, and safety means able at least to the mechanic clamping of said container in said positioning housing of the same, and of activating the electric feed of said powering means when said lid moves from an opening position to a closed position of said container, placed in said positioning housing, characterized in that said safety means comprise kinematic system for a reversibly transformation of the movement of the lid between its open and its closed position into a reversible translation stroke of a first clamping element between a retracted position within said shell extended to the outside of said shell wherein said first clamping element primo engages a first clamp housing provided in said positioning housing and it actuates a first micro-switch generating a signal to activate said electric feed of said powering means.

The transformation kinematic system comprises preferably a longitudinal transmission rod that extends adjacent to the external side of the container and has at its first end a formation for receiving the movement from a cam of the lid and at its second end drive means of at least a first translatory arm placed inside said shell and in turn operatively engaged with a first moving carriage located within the shell and presenting said first clamping element.

The cam is preferably able to transform the reversible rotation of the lid between its open and closed position into a translation of the transmission rod.

Preferably the transmission rod has a translation stroke in a plane orthogonal to the resting plane of said device, said first arm having a translation stroke parallel to the resting plane, and the carriage has a translation stroke to the resting plane of the device and radial with respect to the principal axis of the container.

The first clamping element is preferably a first clamping pin which is positioned radially with respect to the principal axis of the container and is projecting from the end of the first carriage radially turned towards the outside of said shell.

The actuation means comprise at least a drive pin solidly connected to the transmission rod and with a longitudinal axis tilted with respect to the translation direction of the transmission rod and the direction of movement of the first arm, so that the first drive pin is able to apply to the first arm a drive force in both directions of translation of the first arm according to whether the lid is opening or closing.

The first drive pin is slidable within an aperture of said first arm. The shell preferably has internally guide ribs for the translation of said first arm.

The first arm preferably, at the end opposite to the one where is provided its aperture, has a closed slot in which a first grabber pin solidly attached to the first carriage slides.

The drive means preferably comprise also a second drive pin which is solidly attached to said transmission rod and have a longitudinal axis tilted with respect to the translation direction of the transmission rod and to the translation direction of a second translated arm located inside the shell and in turn operatively connected to a second carriage to which it is solidly attached a second clamping element movable in reversible translation between a retracted position inside the protecting shell and an extended position outside the shell wherein a second clamping element engages, provided within the positioning housing and it triggers a second micro-switch generating a signal to activate the electric feed of said heating means.

Further characteristics and advantages of the invention will be clearer from the description of a preferred but non exclusive embodiment of the device for processing and cooking foodstuffs according to the finding, shown in an indicative and non limiting way in the annexed drawings, in which:

FIG. 1 shows a front view of the device for processing and cooking foodstuffs;

FIG. 2 shows an axial vertical view of the device for processing and cooking in FIG. 1;

FIG. 3 shows a perspective view of the protective shell applied to the base of the container and of some parts present inside it;

FIG. 4 shows a view of the device in FIG. 1 in a detaching configuration, and horizontally in section along the line A-A;

FIG. 6 shows a view of the device in FIG. 1 in a clamping configuration, and horizontally in section along the line A-A;

Figure 5:
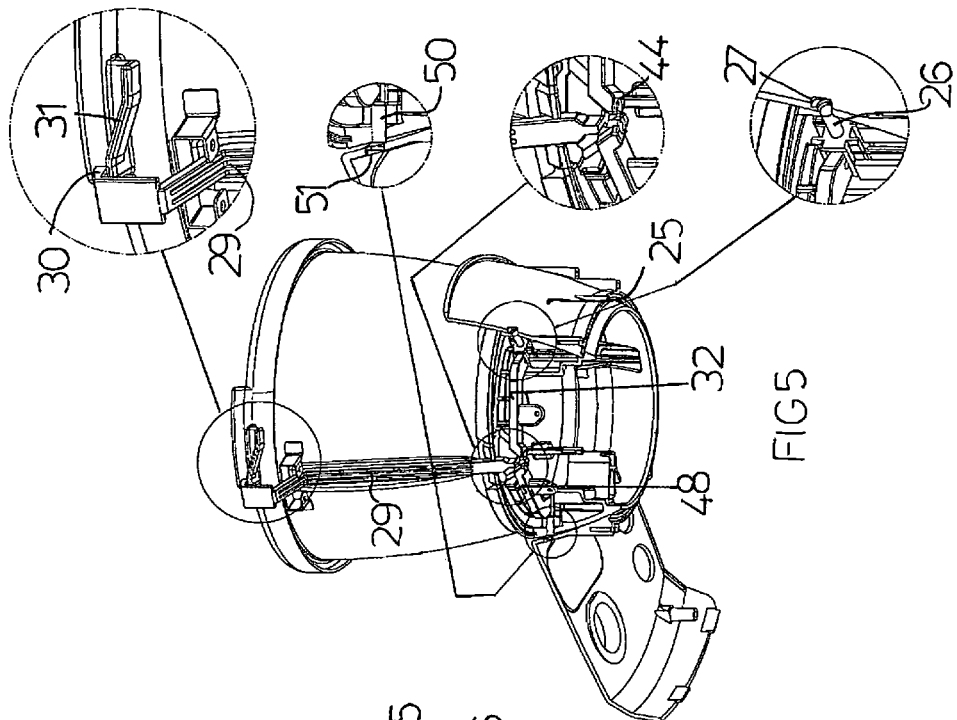
FIG. 5 shows a perspective view of the device in FIG. 1 in a detaching configuration and with the shell in section for easy purpose, and with enlargements of various details.
Figure 7:
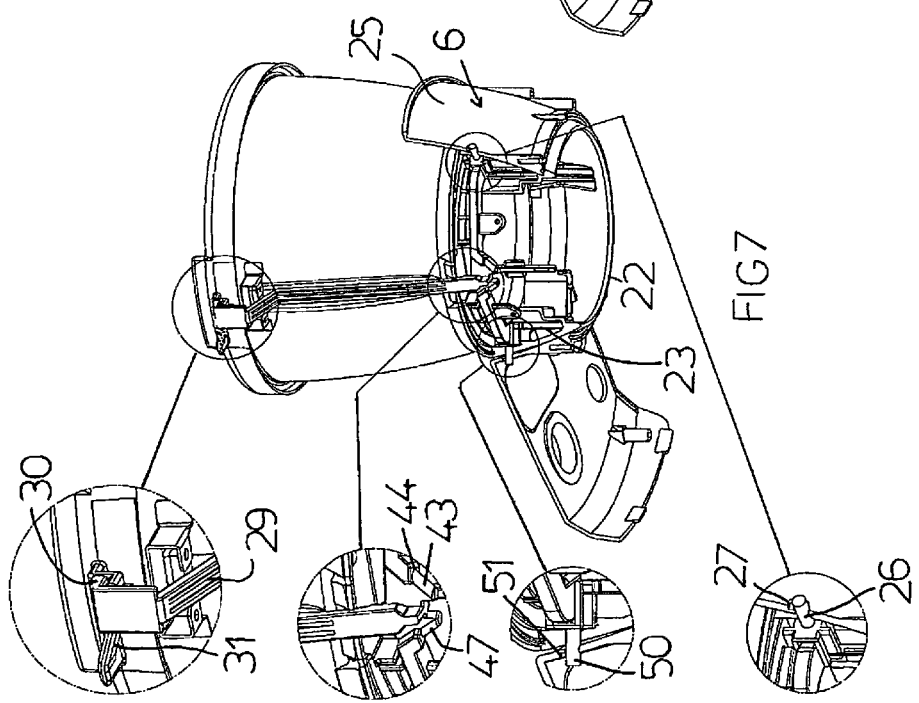
FIG. 7 shows a perspective view of the device in FIG. 1 in a clamping configuration, and in section for easy purpose, and with enlargements of various details.

With reference to the cited figures, a device for processing and cooking foodstuffs is shown, wholly indicated with the reference numeral 1.

The device 1 comprises a base 2, a container 3 bringing fixed on the external side of its base 4 a protective shell 5 by which the container 3 rests in a positioning housing 6 formed on the base 2 and a lid 7 for closing the container 3.

The base 2 is internally hollow for housing inside it a part of the components of the device 1 and has a plane internal surface 8 for the horizontal rest plane 9, and an upper surface 10 having a recess defining the housing 6.

The shell 5 has a circular base 22 and a round side wall 23 for connecting the base 22 with the base 4 with a diameter greater than the container 3, whereas the housing 6 has a base 24 having substantially the same diameter of the base 22 of the shell 5 and a lateral wall 25 with a form conjugated to that of the lateral wall 23 of the shell 5.

The container 3 has electric heating means, in particular an electric resistance 11 incorporated in its base 4 by means of brazing.

The container 3 supports inside it a shaft 12 carrying tools 13.

The tool 13 in this specific case comprises a plurality of blades. The shaft 12 can rotate upon itself and it is coaxially placed with respect to the central vertical axis 14 of the container 3.

Inside the base 2 electric movement means of the shaft 12 are present, comprising in particular a motor 15 which by means of a belt 16 actuates rotatably upon itself a vertical control axis 17 of the shaft 12 carrying tools.

The control axis 17 project externally to the base 2 through an aperture 18 centrally formed in the positioning housing 6.

The shaft 12 carrying tools extends through the base 4 of the container 3 and externally to the container 3 through the shell 5 and it terminates at its external end with respect to the container 3, with a toothed gear 19 of the movement, engageable with a counter-gear 20 present at the end of the control axis 17.

When the container 3 is correctly placed in the housing 6, the shaft 12 engages with the control axis 17 resulting coaxial with the same.

The control axis 17 is placed inside the central part of the base 2, whereas the control panel 21 with the respective programming an and controlling buttons of the device 1 are placed with respect to the control axis 17 peripherally to the base 2 from the opposite part to the internal peripheral position of the base 2, where the motor 15 is positioned.

The device 1 comprises safety means able both to mechanically clamp of the container 3 in the positioning housing 6 and to actuate the electric supplying circuit of the motor 15 when the lid 7 moves from the opening to the closing position of the container 3 placed in the positioning housing 6.

The safety means comprise a reversible kinematic system of the movement of the lid 7 between its opening and its closing position in a reversible translatory stroke of a first clamping element 26 between a retracted position inside the protective shell 5 and a protruded position outside the protective shell 5 in which the first clamping element 26 engages in a first clamping housing 27 formed in the positioning housing 6 and active in a first micro-switch 28 for generating an actuation signal of electric supply of the motor 15.

The kinematic system comprises a longitudinal return rod 29 protruding longitudinally with respect to the external side of the container 3 and it has at its first end a profile 30 for effecting the movement from a cam 31 of the lid 7 and at its second end actuation means of at least one translatory arm 32 placed inside the protective shell 5 and in turn it is operatively engaged with a first translatory carriage 33 always placed inside the protective shell 5 and having the first clamping element 26.

The lid 7 has a peripheral edge 39 protruding along a circumference centred on the middle axis 14 of the container 3.

The cam 31 is able to transform a rotary reversible of the lid 7 upon itself around its middle axis 14 of the container 3 between an opening position and a closing position of the container 3 in a translation of the return rod 29.

The return rod 29 is protected under a frame 34 fixed on the protective shell 5 and having on its internal side a translation guide 35 for the return rod 29.

The frame 34 is incorporated in its upper part with a handle 37 for the grasping of the container 3.

In order to support the rotation of the lid 7 upon itself and around the axis around the axis 14 of the container 3, the handle 37 has a guide groove 38 with the shape of an arc centered on the axis 14 of the container 3 in which the peripheral edge 39 of the lid 7 engages.

The return rod 29 is so configured to have the shaping 30 for the movement from a cam 31 of the lid 7 in the handle part 37 that is radially external with respect to the guide groove.

In a diametral position opposite to the handle 37 is present a further handle 40 incorporated with a frame 41 fixed to the shell 5.

Also the handle 40 has a groove 42 for the guide of the rotation of the peripheral edge 39 of the lid 7.

The return rod 29 has a substantially vertical orientation and a translation stroke in a substantially vertical direction.

The first arm 32 has a horizontal orientation and a translation stroke in a horizontal direction fixed by guide ribs 45 present on the internal side of the shell 5.

The first carriage 33 is conducted in order to slide along a translation direction that is horizontal and radial with respect to the axis 14 of the container 3.

The horizontal translation direction of the first arm 32 forms a sharp angle with the horizontal and radial direction of the first carriage 33.

The first clamping element 26 comprises a first clamping element radially oriented with respect to the axis 14 of the container 3 and protruding from the end of the first carriage 33 radially directed towards the outside of the shell 5.

The actuation means of the first arm 32 comprise a first pin 43 solidly in translation with respect to the return rod 29 and slidably blocked in an aperture 44 of the first arm 32.

The first arm 32 has in turn, at its end opposite to that in which the aperture 44 is formed, a closed slot 46 in which a first grasping pin 60 of the integral movement with respect to the first carriage 33 can slide.

The first drive pin 43 advantageously has a longitudinal axis that is inclined with respect to the translation direction of the return rod 29 and to the translation direction of the first arm 32 and just because to this particular tilting, it is suitable to exert on the first arm 32 a drive force in both sense of the translation direction of the same, according to the rotary movement for opening or closing the lid 7.

The actuation means also comprise a second drive pin 47 solidly with the return rod 29 and having a longitudinal axis tilted with respect to the translation direction of the return rod 29 and to the translation direction of a second translatory arm 48 placed inside the shell 5 and in turn operatively engaged with a second carriage 49 with which it is integral with a second clamping element 50 reversibly translated between a retracted position inside the protective shell 5 and a protracted position outside the protective shell 5 in which it engages in a second clamping housing 51 formed in the positioning seat 6 and actuates a second micro-switch 52 for generating an actuation signal of the electric feeding group of the electric resistance 11.

The kinematic chain system between the return rod 29 and the second carriage 49 is the same of the one in detail between the return rod 29 and the first carriage 33, and so it will not described in more detail in the following.

The two kinematic chain systems are in a position specular with respect to a diametric plane of the container 3 having the centerline of the handles 37 and 40.

The operation of the device 1 according to the invention is clear from what here described and shown and in particular it is substantially the following:

If the container 3 is separated from the base 2, the user grasps it and places it in the positioning housing 6.

The orientation angle between the container 3 and the housing 6 with respect to the axis 14 is obligatory, in order to align the clamping elements 26, 50 to their respective clamping housings 27, 51.

For such a task vertical flaps 65 external with respect to the shell 5 and engaging in suitable vertical return grooves 66 formed in the housing 6 during the vertical movement downwards of the container 3.

The lid 7 is turned from the opening to the closing position.

This rotation moves the two over described kinematic chains.

In particular the cam 31 engages with the shaping of the return rod 29 which vertically translated downwards and with their tilted drive pins 43, 47 in turn realizes the translation of the two arms 32, 48 in the mutual withdrawal direction.

The closed flaps 46, 61 of the arms 32, 48 are tilted such to permit the translation in a radially direction towards the outside of the respective grasping pins of the movement 60, 62 with which they are engaged, when the arms 32, 48 mutually withdraw.

The arms 32, 48 so actuate the respective carriages 33, 49 in the radial direction towards the outside.

The clamping pins 26, 50 introduce themselves in the respective housings 27, 51 and so they mechanically block the container 3 in the positioning housing 6.

At the end of their stroke, the blocking pins 26, 50 actuate the respective micro-switches 28, 52 which operates the actuation of the feeding circuit of the motor 15 and of the feeding circuit of the electric resistance 11. At this point, the control by the user through the buttons 21 for choosing the processing and cooking device determines the exciting of the motor 15 and of the electric resistance 11.

In the rotary movement contrary to the opening of the lid 7, the cam returns the rod 29 in a vertical translation opposite upwards returning the two kinematic chains in the initial configuration. In particular the clamping pins 26, initially release their respective micro-switches 28, 52 which generate a switching-off of the electric feeding circuit of the motor 15 and of the electric circuit 11 for feeding the resistance, and then they disengage from their respective housings 27, 51 by releasing the container 3 which so can be removed. At this point also the container remains in position on the base 2, and a further control through the buttons 21 for choosing the processing and cooking program cannot determine the exciting of the motor 15 and of the electrical resistance 11 because the respective feeding circuits are not actuated.

In practice it is clear that the processing and coking device according to the invention is particularly advantageous in that it guarantees a mechanical and electrical safety by keeping a compact structure and an extreme use capability.

The processing and cooking device for foodstuffs so conceived is susceptible of various changes and modifications, all within the invention scope; furthermore all the details can be substituted by technically equivalent components.

In practice the used materials and also their size can be of any kind, according to the needs and to the state of the art.

The invention claimed is:

1. Device (1) for the processing and cooking of foodstuffs, including a base (2), a container (3) with, on the outer side of its bottom (4), a fixed protecting shell (5) by means of which the container (3) stands in a positioning housing (6) provided on said base (2), a lid (7) to close said container (3), electrical heating means supported by said container (3), a shaft (12) carrying tools (13) rotatably supported inside said container (3), electric means for powering said shaft (12), and safety means at least capable of mechanically clamping the container (3) into its positioning housing (6) and of activating the electric feed of said powering means when said lid (7) moves from an open position to a closed position of said container (3) positioned in said positioning housing (6), characterized in that said safety means comprise kinematic system for reversibly transformation of the movement of the lid (7) between its open position and its closed position into a reversible translation stroke of a first clamping element (26) between a withdrawn position within said protecting shell (5) and an extended position outside said shell (5) wherein said first clamping element (26) engages a first clamp housing (27) provided in said positioning housing (6) and triggers a first micro-switch (28) generating a signal to activate said electric feed of said powering means.

2. Device (1) according to claim 1, characterized in that said transformation kinematic system comprises a longitudinal transmission rod (29) which is adjacent to the outer lateral side of said container (3) and presents at a first its end a formation (30) for receiving the movement of a cam (31) of the lid (7) and at a second its end drive means for driving in translation at least a first arm (32) located inside said shell (5) and, in turn, operationally engaged with a first moving carriage (33) located within the shell (5) and presenting said first clamping element (26).

3. Device (1) according to claim 2, characterized in that said cam (31) is designed to transform the reversible rotation of the lid (7) between said open and closed position into a translation of the transmission rod (29).

4. Device (1) according to claim 3, characterized in that said transmission rod (29) has a translation stroke in a plane orthogonal to the resting plane of said device (1), said first arm (32) has a translation stroke in a plane parallel to the resting plane of said device (1), and said first carriage (33) has a translation stroke parallel to the resting plane of said device (1) and radial with respect to the principal axis (14) of the container (3).

5. Device (1) according to claim 2, characterized in that said first clamping element (26) comprises a first clamping pin which is positioned radially to the principal axis (14) of the container (3) and is projecting from the end of the first carriage (33) radially turned towards the outside of said shell (5).

6. Device (1) according to claim 2, characterized in that the drive means comprise at least a drive pin (43) solidly connected to the transmission rod (29) and with a longitudinal axis which tilts in relation to the direction of movement of the transmission rod (29) and the direction of movement of the first arm (32) so that said first drive pin (43) is able to apply to the first arm (32) a drive force in both directions of translation of the first arm (32) according to whether the lid is opening or closing (7).

7. Device (1) according to claim 6, characterized in that the first drive pin (43) is slidable within an aperture (44) of said first arm (32).

8. Device (1) according to claim 2, characterized in that inside said shell (5) there are guide ribs (45) for the translation of said first arm (32).

9. Device (1) according to claim 7, characterized in that said first arm (32), at the opposite end to the one where is provided said aperture (44), has a closed slot (46) in which a first grabber pin (60) slides, solidly attached to the first carriage (33).

10. Device (1) according to claim 6, characterized in that said drive means comprise a second drive pin (47) which is solidly attached to said transmission rod (29) and has a longitudinal axis which tilts in relation to the direction of movement of the transmission rod (29) and the direction of movement of a second arm (48) which is located inside the shell (5) and is, in turn, operationally connected to a second carriage (49) to which is solidly attached a second clamping element (50) movable in reversible translation between a withdrawn position inside the protecting shell (5) and an extended position outside the protecting shell (5) wherein engages a second clamping element (51) provided within said housing (6) and triggers a second micro-switch (52) generating a signal to activate the electric feed of said heating means.

* * * * *